United States Patent [19]

Sartori et al.

[11] 4,112,052

[45] Sep. 5, 1978

[54] PROCESS FOR REMOVING CARBON DIOXIDE CONTAINING ACIDIC GASES FROM GASEOUS MIXTURES USING AQUEOUS AMINE SCRUBBING SOLUTIONS

[75] Inventors: Guido Sartori, Linden, N.J.; Frederic Leder, Corona Del Mar, Calif.

[73] Assignee: Exxon Research & Engineering Co., Linden, N.J.

[21] Appl. No.: 862,197

[22] Filed: Dec. 19, 1977

Related U.S. Application Data

[63] Continuation-in-part of Ser. No. 590,427, Jun. 26, 1975, abandoned.

[51] Int. Cl.$^2$ ............................................. B01D 53/34
[52] U.S. Cl. .................................. 423/228; 423/236; 423/243
[58] Field of Search ................ 423/220, 223, 226–229, 423/232, 233, 243, 236; 252/189; 260/584 R

[56] References Cited

U.S. PATENT DOCUMENTS

| | | | |
|---|---|---|---|
| 1,783,901 | 12/1930 | Bottoms | 423/228 |
| 2,139,122 | 12/1938 | Hass et al. | 260/584 R |
| 2,139,124 | 12/1938 | Hass et al. | 260/584 R |
| 2,176,441 | 10/1939 | Ulrich et al. | 423/228 |
| 2,718,454 | 9/1955 | Wylie | 423/229 |
| 3,637,345 | 1/1972 | Leder | 423/228 |
| 3,681,015 | 8/1972 | Gelbein et al. | 423/228 |
| 3,793,434 | 2/1974 | Leder | 423/228 X |
| 3,856,921 | 12/1974 | Shrier et al. | 423/229 X |

FOREIGN PATENT DOCUMENTS

| | | | |
|---|---|---|---|
| 619,193 | 4/1961 | Canada | 423/228 |

OTHER PUBLICATIONS

Sharma, "Kinetics of Reaction of Carbonyl Sulfide and Carbon Dioxide with Amines and Catalysis of Bromsted Bases of the Hydrolysis of COS", Transactions Faraday Society, vol. 61, pp. 681–688, 1965.

Frahn et al., "Paper Ionophoresis of Amino Compounds, Formation of Carbamates and Related Reactions," Aust. J. Chem., vol. 17, pp. 256–273, 1964.

Shrier, "Carbon Dioxide Absorption into Amine-Promoted Potash Solutions", Ind. & Eng. Chem. Fundamentals, vol. 8, pp. 415–423, 1969.

Jensen, "Studies on Carbamates", Acta Chemica Scandinavica, vol. 11, pp. 499–505, 1957.

Danckwertz et al, "The Absorption of Carbon Dioxide Into Solutions of Alkalis and Amines", The Chemical Engineer, Oct. 1966, pp. 244–280.

*Primary Examiner*—Earl C. Thomas
*Attorney, Agent, or Firm*—Albert P. Halluin

[57] ABSTRACT

Carbon dioxide containing acidic gases are substantially removed from a normally gaseous mixture by a process comprising contacting the normally gaseous mixture with an aqueous amine solution, wherein at least one of the amines is a sterically hindered amine. The process is operated at a thermodynamic cyclic capacity (as determined from the vapor liquid equilibrium isotherm of the vapor-liquid system) which is greater than in an aqueous amine $CO_2$ scrubbing process wherein monoethanolamine is the only amine utilized under similar conditions of gaseous feed composition, scrubbing solution composition, temperatures and pressures. A particularly preferred sterically hindered amine is 2-amino-2-methyl-1-propanol.

19 Claims, 2 Drawing Figures

PROCESS FOR REMOVING CARBON DIOXIDE CONTAINING ACIDIC GASES FROM GASEOUS MIXTURES USING AQUEOUS AMINE SCRUBBING SOLUTIONS

CROSS REFERENCE TO RELATED APPLICATIONS

This application is a continuation-in-part of U.S. application Ser. No. 590,427, filed June 26, 1975, and now abandoned. This application is related to U.S. application Ser. No. 750,520, filed Dec. 14, 1976, now U.S. Pat. No. 4,094,957, issued June 13, 1978; U.S. application Ser. No. 768,420, filed Feb. 14, 1977; and U.S. application Ser. No. 768,421, filed Feb. 14, 1977.

BACKGROUND OF THE INVENTION

1. Field of the Invention

This invention relates to an improved process for removing carbon dioxide containing acidic gases from normally gaseous mixtures containing them and more particularly relates to a process of accomplishing substantial removal of carbon dioxide containing acidic gases from normally gaseous mixtures by contacting the normally gaseous mixtures with an aqueous solution containing a sterically hindered amine.

2. Description of the Prior Art

It is well known in the art to treat gases and liquids, such as mixtures containing acidic gases including $CO_2$, $H_2S$, $SO_2$, $SO_3$, $CS_2$, HCN, COS and oxygen and sulfur derivatives of $C_1$ to $C_4$ hydrocarbons with amine solutions to remove these acidic gases. The amine usually contacts the acidic gases and the liquids as an aqueous solution containing the amine in an absorber tower with the aqueous amine solution contacting the acidic fluid counter-currently.

The acid scrubbing processes known in the art can be generally broken into three categories.

The first category is generally referred to as the aqueous amine process where relatively concentrated amine solutions are employed during the absorption. This type of process is often utilized in the manufacture of ammonia where nearly complete removal of the acid gas, such as $CO_2$, is required. It is also used in those instances where an acid gas, such as $CO_2$, occurs with other acid gases or where the partial pressures of the $CO_2$ and other gases are low. Aqueous monoethanolamine (MEA) is widely used in this type of process since it provides a high degree of $CO_2$ removal. One of its drawbacks is the high stability of its carbamate which causes its regeneration to be slow and incomplete.

A second category is generally referred to as the aqueous base scrubbing process or "hot pot" process. In this type of process a small level of an amine is included as an activator for the aqueous base used in the scrubbing solution. This type of process is generally used where bulk removal of an acid gas, such as $CO_2$, is required. This process also applies to situations where the $CO_2$ and feed gas pressures are high. In such processes, useful results are achieved using aqueous potassium carbonate solutions and an amine activator.

A third category is generally referred to as the nonaqueous solvent process. In this process, water is a minor constituent of the scrubbing solution and the amine is dissolved in the liquid phase containing the solvent. In this process, up to 50% of the amine is dissolved in the liquid phase. This type of process is utilized for specialized applications where the partial pressure of $CO_2$ is extremely high and/or where many acid gases are present, e.g., COS, $CH_3SH$ and $CS_2$.

The present invention pertains to an improved process for practicing the first category of acid scrubbing processes described above, namely, the aqueous amine process where relatively concentrated amine solutions are employed during the absorption. Many industrial processes for removal of carbon dioxide containing acidic gases use regenerable aqueous solutions of amines which are continuously circulated between an absorption zone where the acidic gases including the carbon dioxide are absorbed and a regeneration zone where the aqueous amine containing absorption solution which is saturated with the acidic components is desorbed usually by steam stripping. The capital cost of these acid scrubbing processes is generally controlled by the size of the absorption and regeneration towers, the size of the reboilers for generating stripping steam, and the size of the condensers which condense spent stripping steam so that condensate may be returned to the system to maintain proper water balance.

The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbents which will operate more efficiently and effectively in acid gas scrubbing processes using existing equipment.

There are a number of patents which describe improvements to improve the efficiency of the above-described processes for removing acidic gases from gaseous mixtures. Some of these improvements are described below.

U.S. Pat. No. 1,783,901 to Bottoms teaches the use of aliphatic amine compounds including alkanol amines such as triethanolamine in an aqueous amine scrubbing process. The patent does not mention the use of sterically hindered amines.

U.S. Pat. Nos. 2,139,122 and 2,139,124 to Haas et al discloses aminoalcohols (U.S. Pat. No. 2,139,122 discloses 2-amino-2-methyl-1-propanol) and in page 2, column 2, it is disclosed that these aminoalcohols, due to their basic nature may be utilized to absorb acids such as hydrogen sulfide or carbon dioxide from industrial gases.

Canadian Pat. No. 619,193 teaches the use of various aqueous solutions containing salts of aminoacids for removing carbon dioxide containing gases from gaseous mixtures. This patent is concerned with the same type of acid gas scrubbing process as provided by the instant invention. However, this Canadian patent does not disclose the use of aqueous solutions containing amines wherein the amino group is sterically hindered, and particularly the amino alcohols.

Prior art workers have taught that sterically hindered amines would have low rates of combination with $CO_2$ and apparently concluded, although other explanations are possible, that such sterically hindered amines would be inefficient in $CO_2$ scrubbing processes. For example, Sharma, M. M., *Trans Faraday Soc.*, 61, 681–8 (1965) described the kinetics of reaction of $CO_2$ and COS with 38 amines, some of which are sterically hindered amines. Other researchers have attributed relatively poor absorption rates of $CO_2$ by amines to steric hindrance. See, for example, J. L. Frahn and J. A. Mills,

*Aust. J. Chem.*, 17, 256–73 (1964) and M. B. Jensen, *Acta Chemica Scandinavica*, 11, 499–505 (1957).

Shrier and Danckwerts, *Ind. Eng. Chem. Fundamentals*, 8, 415 (1969) discussed the use of amines as promoters for aqueous carbon dioxide absorption solutions. However, these researchers only ran initial absorption rate experiments and did not recognize the unique capacity advantages obtained by using sterically hindered amines in an acid gas scrubbing process. Also of interest is Danckwerts and Sharma, *The Chemical Engineer*, October 1966, pp. 244–280.

U.S. Pat. No. 2,176,441 to Ulrich et al. teaches the use of aminoacids having a primary, secondary or tertiary amino group and at least two nitrogen atoms to remove acidic gases. The patentees provide various general formulae for the aminoacids taught to be useful in the acid gas scrubbing process. While certain "sterically hindered amines" can be derived by proper choice of substituent groups in the general formulae there is no teaching that these amines will achieve any unexpected results, such as improved regeneration rates coupled with high rates of absorption.

There are a number of patents which disclose the use of various amines as "activators" in an alkaline scrubbing solution wherein the primary absorbent is an alkaline salt such as potassium carbonate. Some of these processes are described in U.S. Pat. Nos. 2,718,454, 3,144,301, 3,637,345, 3,793,434, 3,848,057, 3,856,921, 3,563,695, 3,563,696 and 3,642,430, as well as some other patents such as Belgian Pat. No. 767,105; British Pat. Nos. 1,063,517, 1,218,083, and 1,305,718. British Pat. No. 1,238,696 describes a process whereby acid gases are removed from gaseous streams by use of alkanol amines and an organic solvent.

U.S. Pat. No. 3,856,921 is of interest since it discloses and claims the use of 2-methyl-aminoethanol, 2-ethylaminoethanol, morpholine, pyrrolidine and derivatives thereof as activators for the basic salt of an alkali or alkaline earth metal. However, this patent does not teach the use of sterically hindered amines and/or their use in an aqueous amine acid gas scrubbing process as instantly claimed.

In the prior art processes discussed above, it is apparent that the efficiency of processes employing absorbing solutions is generally limited by the relatively slow rate of transfer of molecules of the acid gas from the gas phase to the liquid phase as well as in the regeneration of the absorbing solution. Many of the above-described prior art processes deal with means to render the acid gas scrubbing process more efficient.

It has now been discovered that sterically hindered amines unexpectedly improve the efficiency, effectiveness and cyclic working capacity of acid gas scrubbing processes in all three of the above-mentioned process categories and in the case of the aqueous amine process the sterically hindered amines are capable of providing an improved cyclic working capacity over monoethanolamine, diethanolamine or diisopropanolamine when used in a similar process. As explained in greater detail hereinafter, it is postulated that the increase in cyclic capacity observed with the sterically hindered amines is due to the instability of their carbamates. In that respect, sterically hindered amines are similar to tertiary amines. Tertiary amines are not used on a commercial scale for carbon dioxide containing acid gas scrubbing due to their low rates of absorption and desorption.

SUMMARY OF THE INVENTION

In one embodiment of the present invention there is provided a continuous process for the removal of carbon dioxide in acidic gas feeds from a normally gaseous feed, containing $CO_2$ which comprises, in sequential steps, (1) contacting said feed with an aqueous scrubbing solution consisting essentially of an amine and water, at conditions whereby said $CO_2$ is absorbed in said scrubbing solution, and (2) regenerating said scrubbing solution at conditions whereby said $CO_2$ is desorbed from said scrubbing solution, the improvement which comprises providing a sterically hindered amine in said scrubbing solution as said amine, and operating said process at conditions whereby the difference between the moles of $CO_2$ absorbed at the end of step (1) (absorption step) and the moles of $CO_2$ absorbed at the end of step (2) (desorption step) would be greater at the thermodynamic equilibrium (as determined from the vapor liquid equilibrium isotherm in the reaction mixture) than in an aqueous amine $CO_2$ scrubbing process wherein monoethanolamine, diethanolamine or diisopropanolamine is the only amine utilized under similar conditions of gaseous feed composition, scrubbing solution composition, temperatures and pressures. Preferably, the process is operated at conditions such that the thermodynamic cyclic capacity would be at least 15% greater, more preferably 20 to 60% greater than in the same process wherein monoethanolamine is the only amine in the scrubbing solution.

The sterically hindered amines used in the process of the present invention are compounds containing at least one secondary amine group attached to either a secondary or tertiary carbon atom or a primary amino group attached to a tertiary carbon atom. The amines are selected to be at least partially soluble in the particular solvent used, i.e. water. In aqueous solutions the sterically hindered amine will preferably additionally comprise one or more water-solubilizing groups which may be selected from the group consisting of amino groups, i.e. additional sterically hindered amino groups, or non-sterically hindered amino groups, e.g., primary amino groups or hydroxy groups. At least one nitrogen atom will have a sterically hindered structure described above.

Preferably, the total amine concentration in the aqueous solution will be in the range from about 1 to about 6 molar, and more preferably from about 3 to about 5 molar. The scrubbing solutions may contain as much as about 65 mol % or more of the sterically hindered amine to optimize absorption of the acid gases.

DESCRIPTION OF THE PREFERRED EMBODIMENTS

Figure 1:
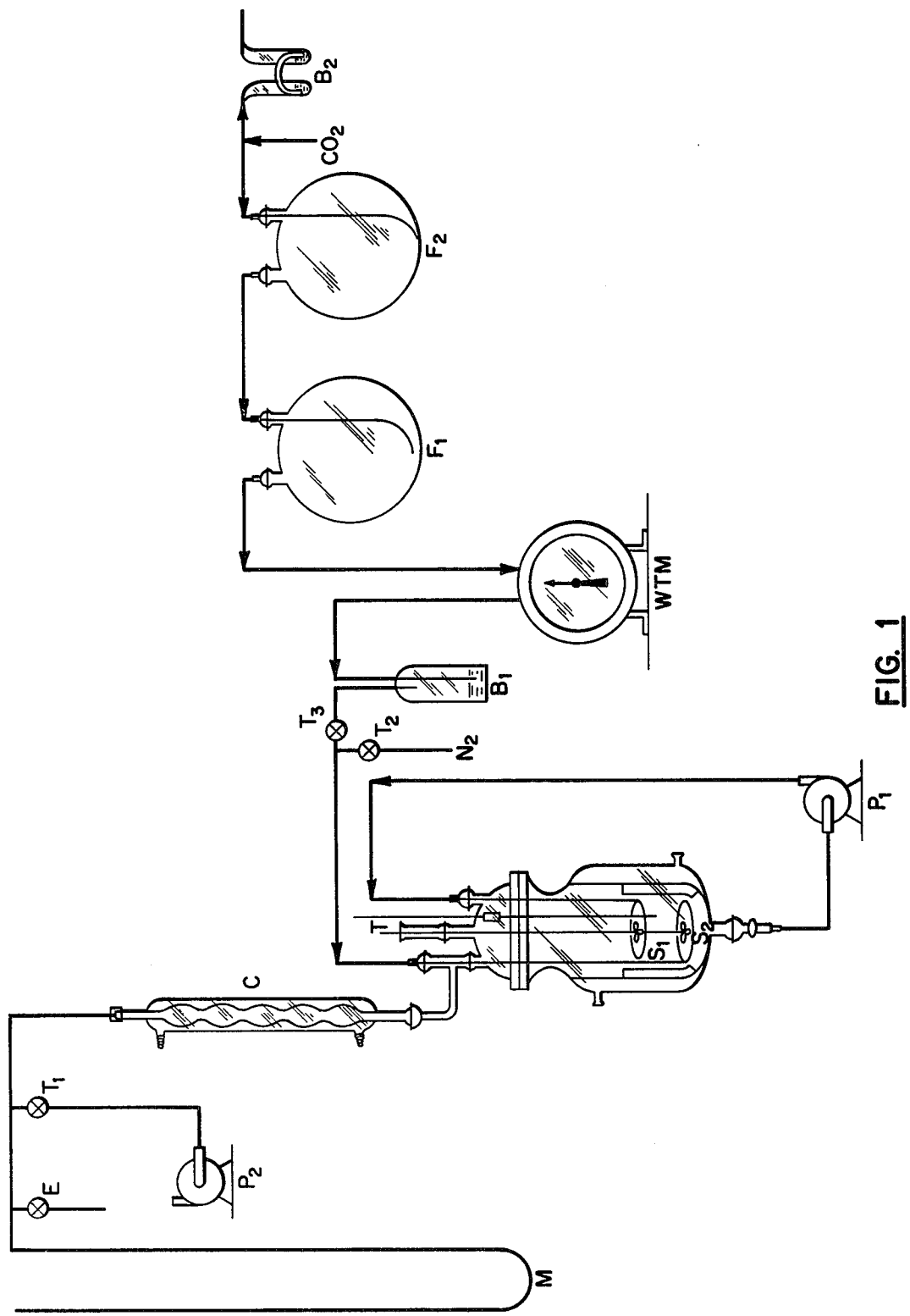
FIG. 1 is a diagrammatic flow sheet illustrating an experimental reaction apparatus for removing carbon dioxide from gas streams.

The term carbon dioxide containing acidic gas also includes $H_2S$, $SO_2$, $SO_3$, $CS_2$, HCN, COS and the oxygen and sulfur derivatives of $C_1$ to $C_4$ hydrocarbons in various amounts as they frequently appear in gaseous mixtures. These acid gases other than the carbon dioxide may be present in trace amounts within a gaseous mixture.

The contacting of the absorbent amine mixture and the carbon dioxide containing acidic gas may take place in any suitable contacting tower. In such processes, the normally gaseous feed from which the acid gases are to be removed may be brought into intimate contact with the absorbing solution using conventional means, such as a tower packed with, for example, ceramic rings or saddles or with bubble cap plates or sieve plates, or a bubble reactor.

In a preferred mode of practicing the invention, the absorption step is conducted by feeding the gaseous feed into the base of the tower while fresh and/or regenerated absorbing solution is fed into the top. The gaseous mixture freed largely from acid gases e.g., $CO_2$ emerges from the top. Preferably, the temperature of the absorbing solution during the absorption step is in the range from about 20° to about 100° C., and more preferably from 40° to about 60° C. Pressures may vary widely; acceptable pressures are between 5 and 2000 psig, preferably 100 to 1500 psig, and most preferably 200 to 1000 psig in the absorber. The contacting takes place under conditions such that the acid gas, e.g., $CO_2$, is absorbed by the solution. During absorption, the solution is maintained in a single phase.

The absorbing solution containing the water soluble amine which is saturated or partially saturated with gases, such as $CO_2$ and $H_2S$ may be regenerated so that it may be recycled back to the absorber. The regeneration should also take place in a single liquid phase. The regeneration or desorption is accomplished by conventional means, such as pressure reduction, which causes the acid gases e.g., $CO_2$ to flash off or by passing the solution into a tower of similar construction to that used in the absorption step, at or near the top of the tower, and passing an inert gas such as air or nitrogen or preferably steam up the tower. The temperature of the solution during the regeneration step should be in the range from about 50° to about 170° C., and preferably 80° to 150° C. The absorbing solution, after being cleansed of at least a portion of the acid bodies, may be recycled back to the absorbing tower. Makeup absorbent may be added as needed.

For example, during desorption, the acid gases, e.g., $CO_2$-rich solution from the high pressure absorber is sent first to a flash chammber where steam and some $CO_2$ flashed off will in general be about 35 to 40% of the net $CO_2$ recovered in the flash and stripper. Solution from the flash drum is then steam stripped in the packed or plate tower, stripping steam having been generated in the reboiler in the base of the stripper. Pressure in the flash drum and stripper is usually 1 to about 50 psia, preferably 15 to about 30 psia, and the temperature is in the range from about 50° to about 170° C., preferably 80° to about 150° C. Stripper and flash temperatures will, of course, depend on stripper pressure, thus at about 15 to 30 psia stripper pressures, the temperature will be about 80° to about 150° C. during desorption.

In the most preferred embodiment of the present invention, substantially complete removal of carbon dioxide in acidic gases from a normally gaseous feed containing $CO_2$ is accomplished by a continuous process which comprises, in sequential steps: (1) contacting said feed with an aqueous scrubbing solution consisting essentially of an amine and water, wherein the total amine concentration in said solution is in the range from about 1 to about 6 molar, preferably 3 to about 5 molar, said contacting being conducted at conditions whereby the carbon dioxide in the feed gas is absorbed in said scrubbing solution, and preferably at temperatures ranging from about 20° to about 100° C., more preferably from 40° to about 60° C., and at a pressure ranging from about 5 to about 2000 psig, preferably 100 to about 1500 psig, and most preferably 200 to about 1000 psig, and (2) regenerating said scrubbing solution at conditions whereby said $CO_2$ is desorbed from said scrubbing solution, preferably at temperatures ranging from about 50° to about 170° C. and more preferably from 80° to about 150° C. and at a pressure ranging from about 1 to about 50 psia and more preferably from about 15 to about 30 psia, the improvement which comprises providing a sterically hindered amine in said scrubbing solution as at least one of said amines, and operating said process at conditions whereby the difference between the moles of $CO_2$ absorbed at the end of step (1) (absorption step) and the moles of $CO_2$ absorbed at the end of step (2) (desorption step) would be greater at the thermodynamic equilibrium of the vapor-liquid system (as determined from the vapor-liquid equilibrium isotherm of the reaction mixture) than in an aqueous amine $CO_2$ scrubbing process wherein monoethanolamine is the only amine utilized under substantially the same conditions of gaseous feed composition, scrubbing solution composition, temperatures and pressures. The regenerated amine scrubbing solution may thereafter be recycled to the absorber as is or it may be combined with fresh makeup scrubbing solution.

The time of contacting the gaseous mixture with the aqueous amine scrubbing solution may vary from a few seconds to hours, for example, 15 minutes.

After contacting the gaseous mixture with the aqueous amine scrubbing solution until a capacity of at least 80% or preferably at least 90% of the solution is utilized it must be regenerated. Regeneration of the aqueous amine scrubbing (absorption) solution may be accomplished by decreasing the pressure and/or increasing the temperature of the scrubbing solution to a point at which the absorbed carbon dioxide flashes off. The addition of an inert gas, e.g., $N_2$ or steam during the regeneration of the scrubbing solution is also within the scope of the present invention. The process of regeneration is more particularly described in U.S. Pat. No. 3,848,057, herein incorporated by reference. The sterically hindered amines of the present invention allow a more complete desorption as compared to the prior art amines, e.g., monoethanolamine run under the same desorption conditions. Thus, savings in the steam utilized to heat and purge the aqueous amine absorption solution during the regeneration step are obtained.

It is possible, of course, to employ the process of the present invention in conjunction with other acid gas scrubbing processes. For example, solutions rich in carbon dioxide may be first scrubbed by a bulk scrubbing process using the "hot pot" process, preferably the processes disclosed in U.S. application Ser. No. 590,427 and U.S. application Ser. No. 750,520, filed Dec. 14, 1976, entitled "Process for Removing Acid Gases with Hindered Amines and Aminoacids", the disclosures of which are incorporated herein by reference. This coarsely prepurified gas may then be treated in accordance with the teachings of the present invention to remove the last residues of the carbon dioxide containing gases.

THE STERICALLY HINDERED AMINES

The sterically hindered amines useful in the practice of the present invention preferably include those amines which contain one primary amino group which is attached to a tertiary carbon atom. The preferred sterically hindered amines useful in the practice of the present invention include 2-amino-2-methyl-1-propanol, 2-amino-2-methyl-1-butanol, 3-amino-3-methyl-1-butanol, 3-amino-3-methyl-2-butanol, 2-piperidine methanol, 2-piperidine ethanol, 2-methyl piperazine and N₁(1,1-dimethyl-2-hydroxyethyl)-2-methyl-1,2-propanediamine. The most preferred sterically hindered amines include 2-amino-2-methyl-1-propanol, 2-amino-2-methyl-1-butanol, 3-amino-3-methyl-1-butanol and 3-amino-3-methyl-2-butanol.

Nonlimiting examples of the sterically hindered amines useful in the practice of the present invention include:

AMINOETHERS

Sterically hindered amino-hydroxyalkyl ethers:

$H_2N-C(CH_3)_2-CH_2-O-CH_2-CH_2OH$    2(2-amino-2-methylpropoxy)-ethanol

AMINOALCOHOLS

Sterically hindered primary monoaminoalcohols:

$H_2N-C(CH_3)(CH_2CH_3)-CH(OH)-CH_3$    3-amino-3-methyl-2-pentanol 1-hydroxymethyl-cyclopentylamine $H_2N-C(CH_3)_2-CH(CH_3)-CH_2OH$    2,3-dimethyl-3-amino-1-butanol $H_2N-C(CH_2CH_3)(CH_2CH_3)-CH_2OH$    2-amino-2-ethyl-1-butanol 1-methyl-2-hydroxy-cyclopentylamine $H_2N-C(CH_3)_2-CH(OH)-CH_2-CH_3$    2-amino-2-methyl-3-pentanol 2,4-dimethyl-2-amino cyclohexanol 1-hydroxyethyl cyclohexylamine 1-hydroxymethyl-3-methyl cyclohexylamine 2-hydroxymethyl-1-methyl cyclohexylamine $H_2N-C(CH_3)_2-CH_2OH$    2-amino-2-methyl-1-propanol $H_2N-C(CH_3)(CH_2CH_3)-CH_2OH$    2-amino-2-methyl-1-butanol $H_2N-C(CH_3)_2-CH_2-CH_2OH$    3-amino-3-methyl-1-butanol $H_2N-C(CH_3)_2-CH(OH)-CH_3$    3-amino-3-methyl-2-butanol $H_2N-C(CH_3)_2-C(CH_3)_2-OH$    2-amino-2,3-dimethyl-3-butanol $H_2-C(CH_3)-CH(CH_3)-CH_2OH$ (with NH? — as drawn)    2-amino-2,3-dimethyl-1-butanol 1-hydroxymethyl-cyclohexylamine

2-substituted piperidine alcohols 2-piperidine methanol 2-piperidine ethanol

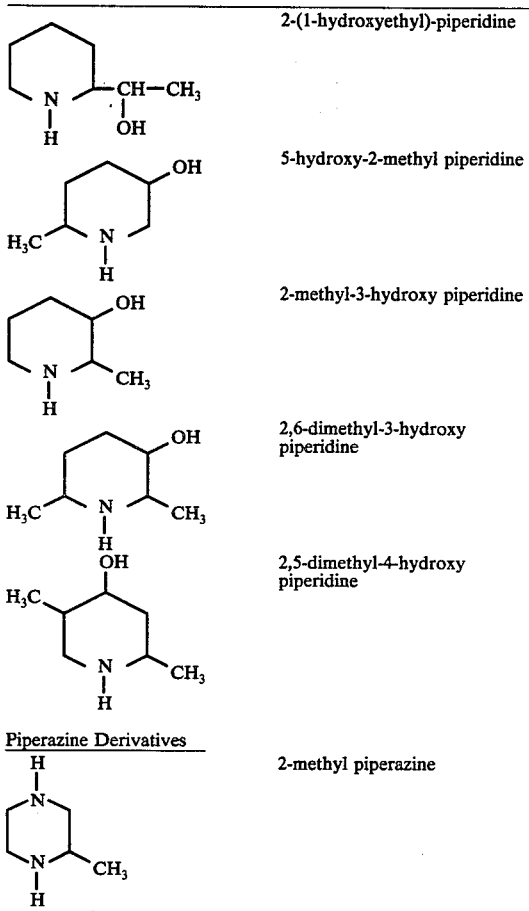

It should be noted that, as used throughout the instant specification, an aqueous amine scrubbing solution consisting not essentially of the sterically hindered amines defined above and water may also include a non-sterically hindered amine, e.g., mono and diethanolamine, etc.

The aqueous amine scrubbing solution consisting essentially of the sterically hindered amine and water may optionally include commonly used additives, such as anti-foaming agents, antioxidants, corrosion inhibitors, etc. Examples of such additives include arsenious anhydride, selenious and tellurous acid, protides, amino acids, e.g., glycine, vanadium oxides, e.g., $V_2O_3$, chromates, e.g., $K_2Cr_2O_7$, etc.

It should be noted that throughout the specification wherein the terms "working capacity" or "cyclic capacity" are referred to, these terms may be defined as the difference between $CO_2$ loading in solution at absorption conditions (step 1) and the $CO_2$ loading in solution at regeneration conditions (step 2). The term "working capacity" is to be construed as synonymous and relates to the "thermodynamic cyclic capacity", that is the loading is measured at equilibrium conditions. This working capacity may be obtained from the vapor-liquid equilibrium isotherm, that is from the relation between the $CO_2$ pressure in the gas and the $CO_2$ loading in the solution at equilibrium at a given temperature. To calculate the thermodynamic cyclic capacity, the following parameters must usually be specified: (1) $CO_2$ absorption pressure, (2) $CO_2$ regeneration pressure, (3) temperature of absorption, (4) temperature of regeneration, (5) solution composition, that is weight percent, and (6) gas composition. The use of these parameters to describe the improved process of the present invention is documented in the examples below, and in FIG. 2. However, the skilled artisan may conveniently demonstrate the improved process which results by use of a sterically hindered amine by a comparison directly with a process wherein the sterically hindered amine is not included in the aqueous scrubbing solution. For example, it will be found when comparing two similar $CO_2$ scrubbing processes (that is similar gas composition, similar scrubbing solution composition, similar pressure and temperature conditions) that when the sterically hindered amines of the instant invention are utilized the difference between the amount of $CO_2$ absorbed at the end of step 1 (absorption step) defined above and step 2 (desorption step) defined above is significantly greater than in an aqueous amine process wherein the amine is monoethanolamine. This significantly increased working capacity is observed also when the scrubbing solution that is being compared comprises an equimolar amount of another prior art amine, such as monoethanolamine. The sterically hindered amines of the invention also have an improved working capacity compared to diethanolamine or diisopropanolamine. It has been found that the use of the sterically hindered amines of the instant invention gives a thermodynamic cyclic capacity (working capacity) which is at least 15% greater than the working capacity of a scrubbing solution which does not utilize a sterically hindered amine, e.g., monoethanolamine and water. Working capacity increases of from 20 to 60% may be obtained by use of the sterically hindered amines of the instant invention.

While not wishing to be bound by theory, it is believed that the use of sterically hindered amines give the above-described improvements for the following reasons.

When $CO_2$ is absorbed into an aqueous primary amine solution, the following reactions occur:

$$R - NH_2 + CO_2 \rightarrow R - NH - COO^- + H^+ \quad (1)$$

$$R - NH - COO^- + H_2O \rightarrow R - NH_2 + HCO_3^- \quad (2)$$

$$H^+ + R - NH_2 \rightarrow R - NH_3^+ \quad (3)$$

The amount of $CO_2$ that can be absorbed depends on the extent of reaction (2). If reaction (2) is negligible, the net result of reactions (1) and (3) will be:

$$2R - NH_2 + CO_2 \rightarrow R - NH - COO^- + R - NH_3^+$$

i.e., the maximum amount of $CO_2$ that can be absorbed is .5 mols/mol of amine.

On the other hand, if reaction (2) is quantitative, the net result of reactions (1), (2), and (3) will be $$R - NH_2 + CO_2 + H_2O \rightarrow HCO_3^- + R - NH_3^+$$

i.e., the maximum amount of $CO_2$ that can be absorbed is 1 mol/mol of amine.

The extent of reaction (2) depends on the nature of R, particularly on its steric configuration. If R is a primary alkyl group, the carbamate will be relatively stable and its decomposition, i.e. reaction (2), will be incomplete. The maximum amount of $CO_2$ that can be absorbed will be only slightly higher than 0.5 mols/mol of amine. On the other hand, if R is a tertiary alkyl group, the carbamate will be very unstable and its decomposition, i.e. reaction (2) will be practically complete. The maximum amount of $CO_2$ that can be absorbed will be close to 1 mol/mol of amine. Thus, when the amine is sterically hindered, $CO_2$ absorption is more complete than when it is unhindered.

When desorption is carried out, reactions (1) (2) and (3) go from right to left. If R is a primary alkyl group, the decomposition of the carbamate will be incomplete i.e. desorption will be only partial. On the other hand, if R is a tertiary alkyl group, there will be no way for $CO_2$ to be in a stable form and desorption will be practically complete. Therefore, the amount of $CO_2$ absorbed or desorbed per mole of amine is higher when the amine is sterically hindered.

If the amino group is secondary, a secondary alkyl group attached to it is enough to provide steric hindrance.

Besides increasing working capacity and rates of absorption and desorption, the use of sterically hindered amines leads to lower steam consumption during desorption due to the lower amount and easier decomposition of the carbamate.

Steam requirements are the major part of the energy cost of operating a $CO_2$ scrubbing unit. Substantial reduction in energy, i.e. operating costs will be obtained by the use of the process of the instant invention. Additional savings from new plant investment reduction and debottlenecking of existing plants may also be obtained with the process of the instant invention. The removal of $CO_2$ from gas mixture is of major industrial importance. The larger-scale applications fall into two categories:

(a) The hydrogen industry, where hydrogen mixed with $CO_2$ is manufactured from gas, coal or petroleum fractions; large amounts of hydrogen are used in the ammonia industry and the amount of $CO_2$ to be removed is of the order of 1.2 to 2.2 tons per ton of $NH_3$.

(b) The gas industry:
  (1) Treatment of natural gases containing large concentrations of $CO_2$.
  (2) Upgrading of town gases manufactured from gasification of coal or reforming of petroleum fractions. A medium-size coal gasification plant, producing 250 MM SCF/D of substitute natural gas, requires removal of 7–8,000 tons/day of $CO_2$.

The amine of the instant invention will preferably be selected according to other parameters besides steric hindrance. For example, it is important also in choosing an amine for use in the process of the instant invention that it have low volatility so that it will not be lost during absorption and desorption. The amines generally should have a boiling point of at least 100° C., preferably at least 180° C.

The invention is illustrated further by the following examples which, however, are not to be taken as limiting in any respect. All parts and percentages, unless expressly stated to be otherwise, are by weight.

EXAMPLE 1

The experimental reaction apparatus used is shown in FIG. 1. It is a vessel having a capacity of about 2.5 liters and a diameter of 10 cm, equipped with a heating jacket. The stirrer shaft carries two three-blade propellers, of which the upper one pushes the liquid downward and the lower one pushes the liquid upward. Pump $P_1$ removes liquid from the bottom of the reactor and feeds it back to the gas-liquid interphase through a stainless-steel sparger $S_1$. Vertical baffles further increase the contact between liquid and gas. Thermocouple T permits the reading of the temperature of the liquid. The top of the reflux condenser C is connected to a U-shaped, open-ended manometer M. The apparatus can be evacuated by means of pump $P_2$ through tap $T_1$. Nitrogen and $CO_2$ can be fed to the bottom of the cell through sparger $S_2$, using respectively taps $T_2$ or $T_3$. $CO_2$, coming from a cylinder, goes first through the two 12-1 flasks $F_1$ and $F_2$, acting as ballasts, then through a 3-1 wet test-meter WTM, then through bubbler $B_1$, where it is saturated with water. Hg-bubbler $B_2$ insures that no air is sucked into flask $F_2$.

Constrictions such as narrow tubings and taps have been carefully avoided in the $CO_2$ path. Tap $T_3$, which is the only one inserted in such a path, has a key with large holes (8 mm).

DETAILED DESCRIPTION OF ABSORPTION-DESORPTION-REABSORPTION EXPERIMENTS

A. Absorption 670 ml of an aqueous scrubbing solution containing 2-amino-2-methyl-1-propanol at a concentration equivalent to 2 gram atoms of nitrogen is charged into the above-described apparatus (the apparatus of FIG. 1). During the charging of the aqueous scrubbing solution, nitrogen is bubbled through $T_2$ while exhaust E is open and tap $T_3$ is closed. The temperature of the aqueous scrubbing solution is brought to 40° C., pump $P_1$ is regulated so as to suck and feed about 4 liters of liquid per minute, the stirrer is kept turning at 1200 rpm. Exhaust E and tap $T_2$ are closed and the apparatus is evacuated by means of pump $P_2$ until the liquid begins to boil, which occurs when the residual pressure is about 50mm Hg. Tap $T_1$ is closed. At this point tap $T_3$ is opened and absorption starts. Simultaneously a timer is started. (In the absorption and reabsorption experiments, the $CO_2/N$ molar ratio was not allowed to exceed 0.47 in order to duplicate conditions used in commercial practice to avoid corrosion). Every time the wet-test-meter (WTM) indicates that a liter has been absorbed, the time is taken. At the beginning the absorption is very rapid.

B. Desorption

Exhaust E is open, taps $T_2$ and $T_3$ are closed. The reaction mixture is brought to 100° C., while stirring slowly and keeping the liquid circulation rate at a minimum. When the temperature reaches 100° C. nitrogen is blown from tap $T_2$ through sparger $S_2$ at a rate of 1 mole/hr. A sample of liquid is taken after 60 minutes.

C. Reabsorption

The reaction mixture is brought back to 40° C., while still blowing nitrogen, the stirrer and pump $P_1$ are regulated in the same way as for the absorption. Exhaust E and tap $T_2$ are closed and the apparatus is evacuated by means of pump $P_2$, until the liquid begins to boil, which occurs when residual pressure is about 50mm Hg. Tap $T_1$ is closed. Tap $T_3$ is opened and reabsorption starts. Simultaneously the timer is started. Times are taken as during absorption.

In Table I, the results of the experiment described above with respect to the $CO_2$ desorption-reabsorption using 2-amino-2-methyl-1-propanol are shown along with the results of similar experiments using other sterically hindered amines and sterically unhindered amines. As shown in Table I, the sterically unhindered amine, monoethanolamine, desorbs and reabsorbs lower amounts of $CO_2$ than the sterically hindered amines. The advantage given by the latter is about 20%.

TABLE I
COMPARISON OF $CO_2$ DESORPTION-REABSORPTION EXPERIMENTS IN AQUEOUS AMINES
2 g. atoms of N in 670 ml. of solution

| Amine | g. $CO_2$ desorbed | g. $CO_2$ reabsorbed |
|---|---|---|
| Monoethanolamine | 30.8 | 30.8 |
| 2-amino-2-methyl-1-propanol | 38.5 | 38.5 |
| $N_1$-isopropyl-2-methyl-1,2-propanediamine | 36 | 36 |
| $N_1$(1,1-dimethyl-2-hydroxyethyl)-2-methyl-1,2-propanediamine | 36 | 37 |

In Table II, the results of some desorption-reabsorption experiments are given, in which again, the scrubbing solution is comprised of the amine and water. The conditions are the same as for the experiments of Table I, the only difference being that absorption and reabsorption were allowed to go to completion. Again, the sterically hindered 2-amino-2-methyl-1-propanol and 3-amino-3-methyl-1-butanol perform better than the sterically unhindered amines.

TABLE II
Reabsorption of $CO_2$ Into Lean Aqueous Solutions
670 ml of 3M solution used in all experiments
T - 40° C.; P - 1 atm.

| Amine | g. $CO_2$ reabsorbed |
|---|---|
| Monoethanolamine | 30.6 |
| Diethanolamine | 41.5 |
| Diisopropanolamine | 41 |
| 2-amino-2-methyl-1-propanol | 64 |
| 3-amino-3-methyl-1-butanol | 55.5 |

EXAMPLE 2

Some vapor liquid equilibrium experiments were carried out to confirm that sterically hindered amines lead to a broadening of the thermodynamic cyclic capacity owing to a shift in the equilibrium position.

The reaction apparatus is a 1-liter autoclave equipped with inlet and outlet tubes for gases. The entering gases are saturated with water and the outgoing gases pass through a condenser so as to keep constant the amount of water present in the autoclave. The autoclave is charged with 500g of an aqueous amine scrubbing solution having an amine concentration of about 3 molar. The autoclave is brought to 100° F. (37.7° C.) to simulate absorption conditions and a gas mixture containing 20% $CO_2$ and 80%. He is slowly blown through the liquid at a pressure of 200 psi. This is continued until the outgoing gas has the same composition as the entering gas, i.e., 20% $CO_2$. At this point the equilibrium between the liquid and the gas has been reached. A liquid sample is taken and analyzed for total $CO_2$.

The experiment is repeated, this time using a $CO_2$-He mixture containing 0.2% $CO_2$ and operating at 50 psi and at a temperature of 250° F. (121.1° C.). After equilibrium has been reached the liquid is analyzed. The results of these experiments using sterically unhindered monoethanolamine compared with the sterically hindered amine, 2-amino-2-methyl-1-propanol are shown in Table III. The high temperature, low $CO_2$, low pressure conditions simulate desorption, whereas the low temperature, high $CO_2$, high pressure conditions simulate absorption. The thermodynamic cyclic capacity (working capacity) of 2-amino-2-methyl-1-propanol is about 45% greater than that shown for monoethanolamine.

TABLE III
EQUILIBRIUM EXPERIMENTS IN AQUEOUS AMINES
Amine - 1.47 mols; Total weight = 500 g.
The numbers given in the table are $CO_2$/amine molar ratios.

| Amine | 250° F. .2% $CO_2$ in gas 50 psi | 100° F. 20% $CO_2$ in gas 250 psi | Difference |
|---|---|---|---|
| Monoethanolamine | .09 | .75 | .66 |
| 2-amino-2-methyl-1-propanol | .03 | .99 | .96 |

Figure 2:
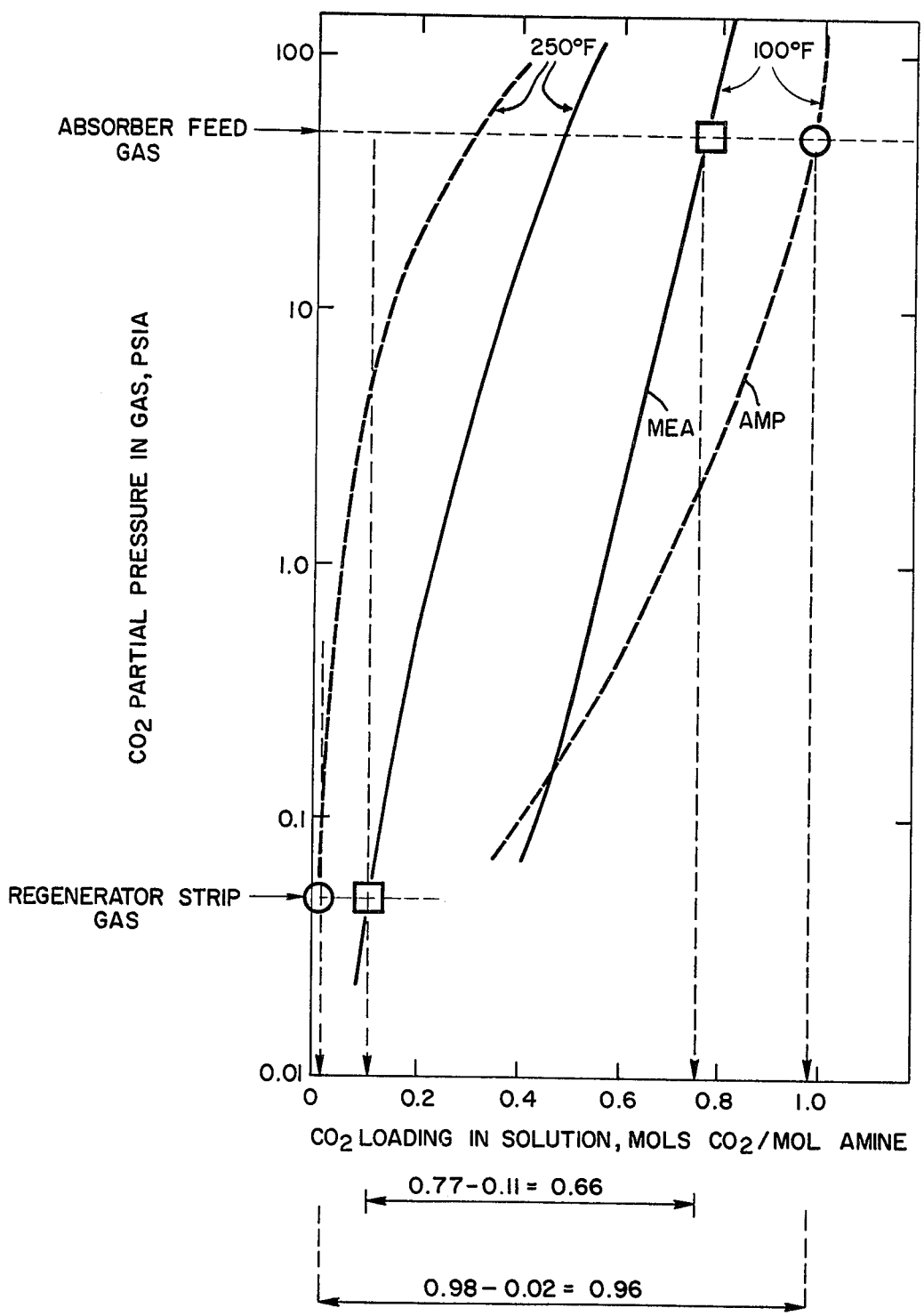
FIG. 2 graphically illustrates the vapor liquid equilibrium isotherms for a 3 molar solution of monoethanolamine ("MEA") (prior art amine) and 2-amino-2-methyl-1-propanol ("AMP") (a sterically hindered amine of the invention) at 100° F. (absorption) and 250° F. (desorption) wherein the $CO_2$ partial pressure is a function of the $CO_2$ absorbed in the solution per mole of amine in the solution.

FIG. 2 illustrates a graphical representation of the vapor-liquid equilibrium isotherms for 3 molar monoethanolamine and 2-amino-2-methyl-1-propanol solutions wherein the $CO_2$ partial pressure is a function of the $CO_2$/amine ratio in the scrubbing solution at 100° F. (37.7° C.) (absorption) and 250° F. (121.1° C.)(desorption). It can be seen from FIG. 2 that at low $P_{CO_2}$ values, the $CO_2$/amine ratio in the solution is lower, whereas at high $P_{CO_2}$ values the $CO_2$/amine ratio in the solution is considerably higher for the aqueous amine scrubbing solution containing the sterically hindered amine, 2-amino-2-methyl-1-propanol.

Thus, it can be surmised from FIG. 2 that one can enjoy the benefits of the present invention by operating the process at the $CO_2$ partial pressures wherein maximum absorption is accomplished as determined from the vapor-liquid equilibrium isotherm curves. In this manner, one can determine how to operate the process at conditions wherein the thermodynamic cyclic capacity would be greater (preferably 15% greater) than the thermodynamic cyclic capacity for monoethanolamine.

EXAMPLE 3

Additional vapor-liquid equilibrium experiments were carried out to further demonstrate the advantages of the invention. In each case, the same procedure and equipment as shown in Example 2 was used. The results and specific conditions used in these experiments are shown in Tables IV and V. As can be seen from the data, the sterically hindered amines, 2-piperidine ethanol and 2-methyl piperazine provided a greater thermodynamic cyclic capacity than the sterically unhindered amines, monoethanolamine and diethanolamine under the same conditions of absorption and desorption.

TABLE IV
VAPOR-LIQUID EQUILIBRIUM EXPERIMENTS IN AQUEOUS AMINE SOLUTIONS

| Amine[a] | $CO_2$/amine molar ratio in solution | | Difference (working capacity) |
|---|---|---|---|
| | 0.2% $CO_2$ in gas at 250° F. 50 psi | 20% $CO_2$ in gas at 100° F. 200 psi | |
| 5M Monoethanolamine | 0.03 | 0.66 | 0.63 |
| 5M Diethanolamine | 0 | 0.64 | 0.64 |
| 4.5M 2-piperidine ethanol | 0 | 0.83 | 0.83 |

[a]500 grams of the aqueous amine solution is used in each experiment.

TABLE V
VAPOR-LIQUID EQUILIBRIUM EXPERIMENTS IN AQUEOUS AMINE SOLUTIONS

| Amine[a] | $CO_2$/amine molar ratio in solution | | |
|---|---|---|---|
| | 0.2% $CO_2$ in gas at 250° F. 200 psi | 20% $CO_2$ in gas at 100° F. 200 psi | Difference (working capacity) |
| 3M Monoethanolamine | 0.18 | 0.75 | 0.57 |
| 3M 2-methyl piperazine | 0.09 | 0.98 | 0.89 |

[a]500 grams of the aqueous amine solution is used in each experiment.

An inspection of the data in Tables IV and V shows that the sterically hindered amines not only absorb more $CO_2$ at absorption conditions, but also desorb more $CO_2$ than the sterically unhindered amines at the same conditions of equilibrium. This translates into a thermodynamic cyclic capacity (working capacity) advantage for the sterically hindered amines. The data shows that when comparing two aqueous amine $CO_2$ scrubbing processes (that is, similar gas composition, similar scrubbing solution, similar pressure and temperature conditions) when the sterically hindered amines are utilized, the difference between the amount of $CO_2$ absorbed at the end of the absorption step (at thermodynamic equilibrium) and desorption step (at thermodynamic equilibrium) is significantly greater, generally at least 15% greater, and often 20 to 60% greater than the working capacity of an aqueous amine scrubbing solution which does not include a sterically hindered amine, i.e. an aqueous amine solution containing monoethanolamine or diethanolamine.

GENERAL

The following experiments using $^{13}C$ Nuclear Magnetic Resonance (NMR) were conducted to help elucidate the chemistry of the hindered amine reaction with $CO_2$. These $^{13}C$ NMR experiments involved the use of $^{13}C$ isotope which is present in an amount of 1.1% (compared to $^{12}C$). $^{13}C$ resonance has a much weaker sensitivity than the proton resonance. However, these limitations can be overcome by using relatively large samples and pulsed (Fourier Transform) instrumentation. The spectrum is a series of singlets corresponding to each variety of carbonyl containing species present. Aqueous solutions of monoethanolamine (MEA), diethanolamine (DEA), 2-amino-2-methyl-1-propanol (AMP) and 2-tertiary butylamino ethanol were examined at various degrees of carbonation.

With conventional monoethanolamine (MEA), the $^{13}C$ NMR spectra indicate that the predominant carbonyl species at carbonation ratios <0.5 is carbamate ion, the remainder being carbonate and bicarbonate. This confirms the literature (P. V. Danckwerts, Gas-Liquid Reactions, McGraw-Hill, 1970). In the case of sterically hindered amines such as 2-amino-2-methyl-1-propanol (AMP) and 2-tertiary butylamino ethanol, there is a single carbonyl peak due predominantly to bicarbonate and carbonate ions, with no direct evidence of any carbamate anion. Details of the spectra suggest, however, that AMP solutions contain a small amount of carbamate whereas 2-tertiary butylamino ethanol (TBAE) gives only bicarbonate and carbonate. Conventional diethanolamine (DEA) shows an intermediate behavior which is much closer to monoethanolamine (MEA) than it is to 2-amino-2-methyl-1-propanol. The results of the $^{13}C$ NMR analysis for 3 molar aqueous aminoalcohol-$CO_2$ reaction solutions are shown in Table VI.

TABLE VI
$^{13}$C-NMR Results For 3M Aqueous Aminoalcohol-$CO_2$ Reactions

| Aminoalcohol | Species Formed at 1 Atm and 40° C In Solution Saturated With $CO_2$ | |
|---|---|---|
| | % Carbamate | % $HCO_3^-$ + $CO_3^=$ |
| MEA | 98 | 2 |
| DEA | 78 | 22 |
| AMP | 10–20 | 80–90 |
| TBAE[1] | 0 | 100 |

[1]A 1.5M solution of 2-tertiary butylamino ethanol (TBAE) was used since 3M would lead to precipitation.

The equilibrium constants estimated from the $^{13}C$ NMR spectra for the reaction:

$$R-NH-COO^- + H_2O \rightleftharpoons R-NH_2 + HCO_3^-$$

are shown in Table VII.

TABLE VII

| Equilibrium Constant $K_3 = \dfrac{[RNH_2][HCO_3^-]}{[RNHCOO^-]}$ at 40° C. | |
|---|---|
| Aminoalcohol | $K_3$ |
| MEA | ~0.08 |
| DEA | ~0.5 |
| AMP | > 10 |
| TBAE | > 10 |

The results in Table VII confirm the large difference in carbamate stability for sterically hindered and unhindered amines.

The $^{13}C$ NMR data shown in Tables VI and VII supports the following reaction mechanism theory (also discussed above). First, dissolved $CO_2$ reacts directly with free amine near the liquid interface to form an unstable carbamate ion:

$$CO_2 + R-NH_2 \rightleftharpoons R-NH-COO^- + H^+ \tag{1}$$

The proton reacts with free amine:

$$H^+ + R-NH_2 \rightleftharpoons R-NH_3^+ \tag{2}$$

Being relatively unstable owing to steric crowding, the carbamate formed in Equation (1) is readily hydrolyzed, converting the absorbed $CO_2$ to bicarbonate ion and regenerating free amine:

$$R-NH-COO^- + H_2O \rightleftharpoons R-NH_2 + HCO_3^- \tag{3}$$

The overall reaction described by Equation (4) below can be seen to be the sum of reactions (1), (2) and (3).

$$CO_2 + R-NH_2 + H_2O \rightleftharpoons R-NH_3^+ + HCO_3^- \tag{4}$$

Prior art workers (e.g., M. B. Jensen, Acta Chem. Scand., 11, 499 (1957); J. L. Frahn, J. A. Mills, Austral. J. Chem., 17, 256 (1964); and M. M. Sharma, Trans. Farad. Soc., 61, 681 (1965)) have taught that steric hindrance reduces rate and extent of carbamate formation. This observation has apparently steered researchers away from the use of sterically hindered amines for $CO_2$ gas scrubbing processes.

As shown by the discovery in the present invention, sterically hindered amines are very efficient as $CO_2$ absorbers because they rapidly pick up 1 mol of $CO_2$ per mol of amine. Conventional primary or secondary amines such as MEA, DEA or DIPA are less efficient, as they rapidly pick up only slightly more than 0.5 mols of $CO_2$ per mol of amine. The reason for the lower utilization with the conventional amines is believed to be the formation of a relatively stable carbamate. The hydrolysis reaction (3), based on the $^{13}C$ NMR analysis occurs to only a very small extent with conventional amines. Reactions (1) and (2) describe conventional amine chemistry quite well.

Experiments on rates of absorption of $CO_2$ into aqueous aminoalcohols show that rates are high with 2-amino-2-methyl-1-propanol and 2-piperidine ethanol, but very low with 2-tertiary butylamino ethanol and tertiary aminoalcohols. These results suggest that a finite concentration of amine carbamate is essential for obtaining good absorption rates. The low-stability, sterically hindered amine carbamate may be acting as a transition complex, facilitating the rate of $CO_2$ absorption into solution.

Scrubbing solution capacity for acid gas is a dominant factor in scrubbing economics. Solution capacity determines the amount of solution to be circulated. Thus, it affects the size of towers, pumps and heat exchangers as well as the utilities for solution heating and cooling.

As shown above, the use of the sterically hindered amines leads to higher equilibrium solution capacity for $CO_2$ than can be obtained with conventional amines. This is further illustrated by the cyclic capacity results from the low-pressure, batch experiments shown in Table VIII, below. These data refer to absorption at 100° F., followed by desorption at 212° F. with nitrogen stripping.

TABLE VIII

Measured Cyclic $CO_2$ Capacity in 3M Aminoalcohol Solutions[1]

|  | Sterically Hindered Amine (AMP) | Conventional Amine (MEA) |
|---|---|---|
| Cyclic Capacity mols $CO_2$/liter | 2.20 | 1.05 |
| Capacity advantage for Sterically Hindered Amine, % | 110 | |

[1] Desorption time: 15 min for AMP, 60 min for MEA.

The higher cyclic capacity found for sterically hindered amine solutions is due to a different equilibrium behavior. This can be seen by comparing the vapor-liquid equilibrium isotherms shown in FIG. 2 of the drawings (obtained by using 3M aminoalcohol solutions). The sterically hindered aminoalcohol solution shows a much greater dependence of $CO_2$ absorbed on pressure than is the case with the conventional amine (MEA). This accounts for the higher capacity observed with the sterically hindered amines in typical delta-pressure scrubbing cycles. The isotherms for AMP come very close to complete absorption at 100° F. ($CO_2$/amine ~1) and complete desorption at 250° F. ($CO_2$/amine ~0), whereas for the conventional amine extend only slightly above 0.5 mols $CO_2$/mol amine and do not approach complete desorption. This is in line with expectations from the $CO_2$-amine chemistry described above.

While the invention has been described in connection with specific embodiments thereof, it will be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. In a process for removing $CO_2$ from gaseous feeds which comprises, in sequential steps:
    (1) contacting said feed with an aqueous scrubbing solution consisting essentially of an amine and water, at conditions whereby said $CO_2$ is absorbed in said scrubbing solution, and
    (2) regenerating said scrubbing solution at conditions whereby said $CO_2$ is desorbed from said scrubbing solution, the improvement which comprises:
        providing a sterically hindered amine in said scrubbing solution as at least one of the said amines, and operating said process at conditions whereby the difference between the moles of $CO_2$ absorbed at the end of step (1) (absorption step) and the moles of $CO_2$ absorbed at the end of step (2) (desorption step) would be greater at thermodynamic equilibrium of the vapor-liquid system (as determined from the vapor-liquid equilibrium isotherm of the reaction mixture) than in an aqueous amine $CO_2$ scrubbing process wherein monoethanolamine or diethanolamine is the only amine utilized under similar conditions of gaseous feed composition, scrubbing composition, temperatures and pressures.

2. The process of claim 1 wherein the sterically hindered amine is a compound containing at least one secondary amino group attached to a secondary or tertiary carbon atom or a primary amino group attached to a tertiary carbon atom and at least one water solubilizing group.

3. The process of claim 2 wherein the sterically hindered amine is an amino alcohol.

4. The process of claim 1 wherein the sterically hindered amine is selected from the group consisting of 2-amino-2-methyl-1-propanol, 2-amino-2-methyl-1-butanol, 3-amino-3-methyl-1-butanol, 3-amino-3-methyl-2-butanol, 2-piperidine ethanol, 2-piperidine methanol, 2-methyl piperazine and $N_1$ (1,1-dimethyl-2-hydroxyethyl)-2-methyl-1,2-propanediamine.

5. The process of claim 1 wherein the scrubbing solution from step (2) (desorption step) is continuously re-used to absorb a feed containing $CO_2$.

6. The process of claim 1 wherein the process is operated at conditions wherein the thermodynamic cyclic capacity would be at least 15% greater than in a process wherein monoethanolamine or diethanolamine is the only amine utilized under similar conditions of gaseous feed composition, scrubbing solution composition, temperatures and pressures.

7. The process of claim 1 wherein step (1) (absorption step) is carried out at a lower temperature than step (2) (desorption step).

8. The process of claim 1 wherein said scrubbing solution additionally contains an additive selected from the group consisting of antifoaming agents, antioxidants, corrosion inhibitors and mixtures thereof.

9. The process of claim 1 wherein said scrubbing solution additionally contains a sterically unhindered amine.

10. The process of claim 4 wherein the sterically hindered amine is 2-amino-2-methyl-1-propanol.

11. In a process for substantially completely removing carbon dioxide containing gases from a normally gaseous feed, which comprises, in sequential steps:

(1) contacting said feed with an aqueous scrubbing solution consisting essentially of an amine and water, wherein the total amine concentration in said solution is in the range from about 1 to about 6 molar, said contacting being conducted at a temperature ranging from about 20 to about 100° C. and at a pressure ranging from about 5 to about 2000 psig to thereby absorb the carbon dioxide containing acidic gas in said scrubbing solution, and (2) regenerating said scrubbing solution at a temperature in the range from about 50° to about 170° C. and at a pressure ranging from about 1 to about 50 psia to thereby desorb the carbon dioxide containing gases from said scrubbing solution, the improvement which comprises:

providing a sterically hindered amino alcohol selected from the group consisting of 2-amino-2-methyl-1-propanol, 2-amino-2-methyl-1-butanol, 3-amino-3-methyl-1-butanol, and 3-amino-3-methyl-2-butanol in said scrubbing solution as at least one of said amines, and operating said process at conditions whereby the difference between the moles of $CO_2$ absorbed at the end of step (1) (absorption step) and the moles of $CO_2$ absorbed at the end of step (2) (desorption step) would be at least 15% greater at thermodynamic equilibrium in the system (as determined from the vapor-liquid equilibrium isotherm in the reaction mixture) than in an aqueous amine $CO_2$ scrubbing process wherein monoethanolamine is the only amine utilized under substantially the same conditions of gaseous feed composition, scrubbing solution composition, temperatures and pressures.

12. The process of claim 11 wherein the scrubbing solution from step (2) (desorption step) is continuously recycled to absorb a feed containing $CO_2$.

13. The process of claim 11 wherein the sterically hindered amino alcohol is 2-amino-2-methyl-1-propanol.

14. The process of claim 11 wherein the scrubbing solution additionally contains a sterically unhindered amine.

15. The process of claim 11 wherein said scrubbing solution additionally contains an additive selected from the group consisting of antifoaming agents, antioxidants, corrosion inhibitors and mixtures thereof.

16. The process of claim 1 wherein the total amine concentration in the aqueous solution is in the range from about 1 to about 6 molar.

17. The process of claim 1 wherein the total amine concentration in the aqueous solution is in the range from about 3 to about 5 molar.

18. The process of claim 11 wherein the total amine concentration in the aqueous solution is in the range from about 3 to about 5 molar.

19. The process of claim 11 wherein said contacting of said feed is conducted at a temperature ranging from 40° to about 60° C. and at a pressure ranging from 200 to about 1000 psig, and said regenerating is conducted at a temperature ranging from about 80° to about 150° C. and at a pressure ranging from about 15 to about 30 psia.

* * * * *